US009032435B2

(12) United States Patent
Sargent et al.

(10) Patent No.: US 9,032,435 B2
(45) Date of Patent: *May 12, 2015

(54) AD SELECTION AND NEXT VIDEO RECOMMENDATION IN A VIDEO STREAMING SYSTEM EXCLUSIVE OF USER IDENTITY-BASED PARAMETER

(75) Inventors: Peter E. Sargent, Santa Monica, CA (US); Hang Li, Los Angeles, CA (US); Hua Zheng, Beijing (CN); Liang Xiang, Beijing (CN); Chaitanya Laxminarayan, Santa Monica, CA (US); Nathan A. Hinish, Santa Monica, CA (US)

(73) Assignee: HULU, LLC, Santa Monica, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/566,964

(22) Filed: Aug. 3, 2012

(65) Prior Publication Data

US 2012/0304223 A1    Nov. 29, 2012

Related U.S. Application Data

(63) Continuation-in-part of application No. 13/074,863, filed on Mar. 29, 2011, now Pat. No. 8,782,692.

(51) Int. Cl.
*H04N 7/10* (2006.01)
*H04N 7/025* (2006.01)
(Continued)

(52) U.S. Cl.
CPC ..... *H04N 21/8455* (2013.01); *H04N 21/44016* (2013.01); *H04N 21/4532* (2013.01);
(Continued)

(58) Field of Classification Search
USPC ..................................................... 725/32–36
See application file for complete search history.

(56) References Cited

U.S. PATENT DOCUMENTS 5,608,447 A * 3/1997 Farry et al. .................... 725/116
5,654,746 A * 8/1997 McMullan et al. ............. 725/29
(Continued)

FOREIGN PATENT DOCUMENTS

| JP | 2002271736 | 9/2002 |
| JP | 2003162543 | 6/2003 |
| JP | 20061914633 | 7/2006 |

OTHER PUBLICATIONS

International Search Report and Written Opinion dated Mar. 27, 2012.

(Continued)

*Primary Examiner* — Dominic D Saltarelli
(74) *Attorney, Agent, or Firm* — Fountainhead Law Group PC

(57) ABSTRACT

In a streaming video system, a method determining a sequence of video programs playing on an interactive player device may include streaming a first video program including an ad break from a computer server to an interactive player device during a first streaming session. The method may further include automatically selecting a video advertisement or next program from a set of prospective video advertisements for play during the ad break or available programs, based at least in part on the first video program exclusive of any parameter based on user identity. The method may include providing the video advertisement to the interactive player device in the first streaming session at the ad break. Bases for selecting the next ad or program may include program popularity, rate of change in popularity, or other parameter. The method may be embodied in a computing apparatus or system.

26 Claims, 14 Drawing Sheets

(51) Int. Cl.
*H04N 21/845* (2011.01)
*H04N 21/44* (2011.01)
*H04N 21/45* (2011.01)
*H04N 21/472* (2011.01)
*H04N 21/482* (2011.01)
*H04N 21/81* (2011.01)
*H04N 21/8549* (2011.01)

(52) U.S. Cl.
CPC ..... *H04N21/47202* (2013.01); *H04N 21/4826* (2013.01); *H04N 21/812* (2013.01); *H04N 21/8549* (2013.01)

(56) References Cited

U.S. PATENT DOCUMENTS

| | | | |
|---|---|---|---|
| 5,774,170 | A | 6/1998 | Hite et al. |
| 5,848,397 | A | 12/1998 | Marsh et al. |
| 8,296,179 | B1 | 10/2012 | Rennison |
| 8,296,800 | B2 | 10/2012 | Palazzo et al. |
| 8,392,246 | B2 | 3/2013 | Coladonato et al. |
| 2003/0066068 | A1 | 4/2003 | Gutta et al. |
| 2003/0084450 | A1 | 5/2003 | Thurston et al. |
| 2003/0088871 | A1 | 5/2003 | Kimura |
| 2003/0106058 | A1 | 6/2003 | Zimmerman et al. |
| 2003/0112258 | A1 | 6/2003 | Dietz et al. |
| 2003/0126600 | A1 | 7/2003 | Heuvelman |
| 2003/0208756 | A1 | 11/2003 | Macrae et al. |
| 2004/0045028 | A1* | 3/2004 | Harris .............. 725/86 |
| 2004/0163111 | A1 | 8/2004 | Palazzo et al. |
| 2005/0198668 | A1 | 9/2005 | Yuen et al. |
| 2007/0113243 | A1 | 5/2007 | Brey |
| 2007/0157228 | A1 | 7/2007 | Bayer et al. |
| 2007/0174471 | A1 | 7/2007 | Van Rossum |
| 2008/0021775 | A1 | 1/2008 | Lerman et al. |
| 2008/0127246 | A1 | 5/2008 | Sylvain |
| 2008/0148320 | A1 | 6/2008 | Howcroft |
| 2008/0250445 | A1 | 10/2008 | Zigmond et al. |
| 2009/0183199 | A1 | 7/2009 | Stafford et al. |
| 2009/0210899 | A1 | 8/2009 | Lawrence-Apfelbaum et al. |
| 2012/0054804 | A1 | 3/2012 | Howcroft |
| 2012/0096487 | A1 | 4/2012 | Wei et al. |
| 2012/0096488 | A1 | 4/2012 | Wei et al. |
| 2012/0110618 | A1 | 5/2012 | Kilar et al. |
| 2012/0124618 | A1 | 5/2012 | Ruiz-Velasco et al. |
| 2012/0304223 | A1 | 11/2012 | Sargent et al. |

OTHER PUBLICATIONS

International Search Report from International Application No. PCT/US2013/052113 mailed Nov. 22, 2013.
U.S. Appl. No. 13/074,863, filed Mar. 29, 2011 entitled "Method and Apparatus for Recommending Media Programs".
U.S. Appl. No. 13/074,873, filed Mar. 29, 2011 entitled "Process Workflow for Recommending Media Programs".
U.S. Appl. No. 13/074,884, filed Mar. 29, 2011 entitled "Bookmarking Media for Subsequent Viewing".

* cited by examiner

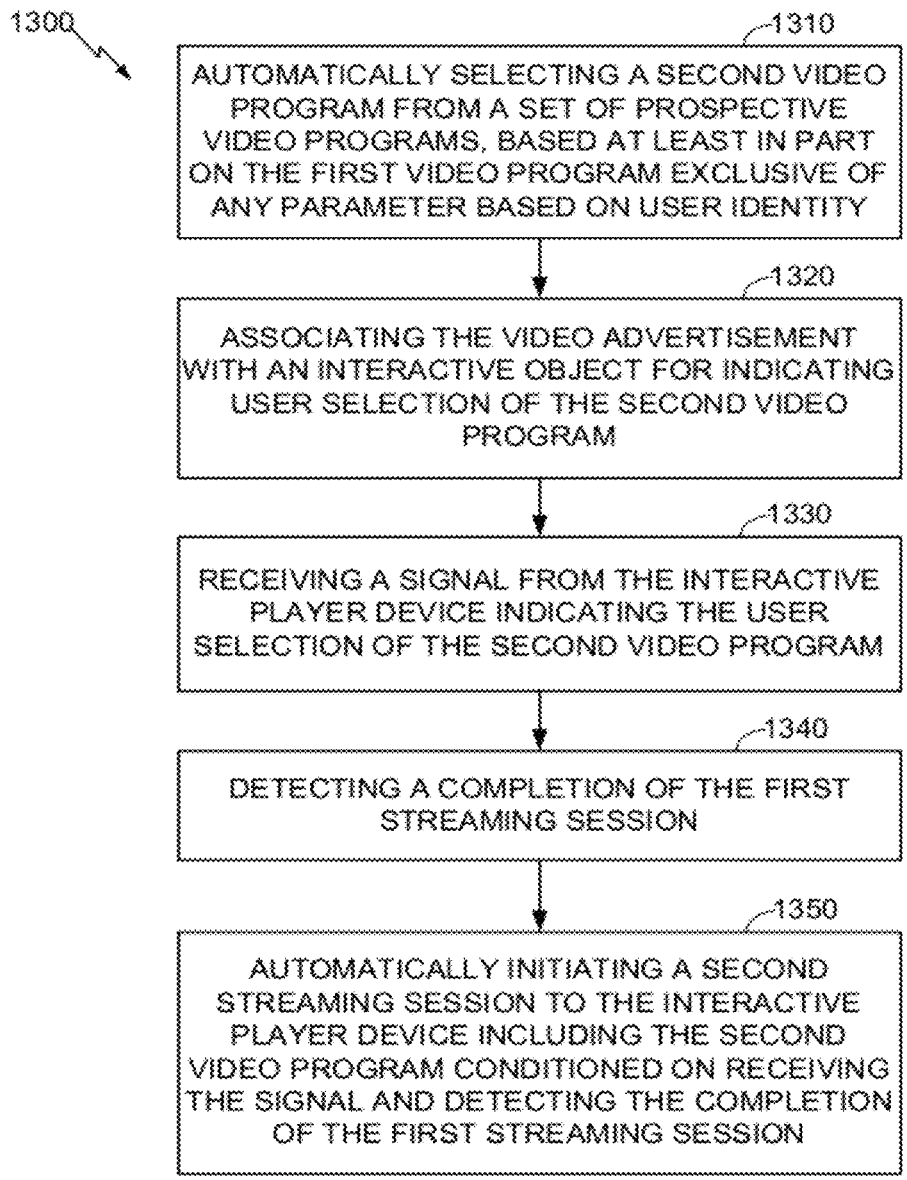

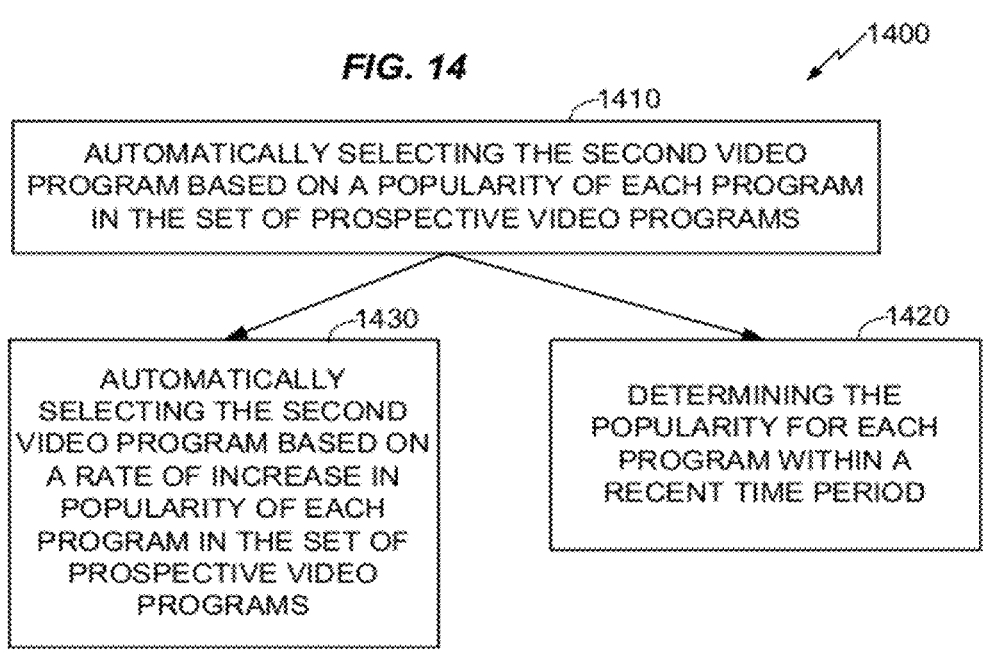
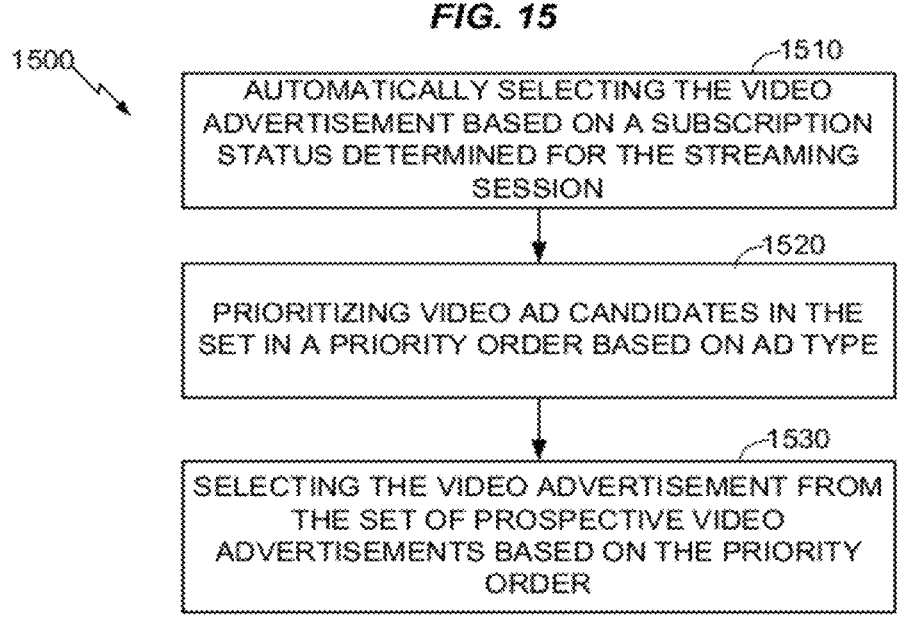

AD SELECTION AND NEXT VIDEO RECOMMENDATION IN A VIDEO STREAMING SYSTEM EXCLUSIVE OF USER IDENTITY-BASED PARAMETER

CROSS-REFERENCE TO RELATED APPLICATION

This application is a continuation-in-part of U.S. non-provisional application Ser. No. 13/074,863, filed Mar. 29, 2011, which is hereby incorporated by reference, in its entirety.

FIELD

The present application relates generally to operation of video streaming systems, and in particular ad selection and video recommendation for clients connected to the video streaming system without using a user identity-based parameter; e.g., when the user identity is unknown or undefined.

BACKGROUND

Distribution of audio-video data may be implemented from a content server to remote client devices over computer networks, telecommunications networks, and combinations of such networks using various methods, for example progressive downloading or streaming.

In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Unlike progressive downloading, streaming media can be delivered on-demand or live. Progressive download may require downloading the entire file or downloading enough of the entire file to start playback at the beginning, whereas streaming may enable nearly immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server may include a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. A streaming media server may communicate with the client device using control messages and data messages to adjust to changing network conditions as the video is played. These control messages can include commands for enabling control functions such as fast forward, fast reverse, pausing, or seeking to a particular part of the file at the client. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) allow more control over the content, because the streaming video data is discarded by the media player after use.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user device at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program. Streaming media players do not rely on buffering to provide random access to any point in the media program. Instead, this is accomplished through the use of control messages transmitted from the media player to the streaming media server.

Technologies such as streaming video or progressive downloading may enable a very large and diverse catalog of video content to be made available to the user for immediate viewing. One of the challenges to the end user in receiving access to such a broad array of video content may include finding programs of interest from among the many programs available. Interfaces may be provided that place video content into different categories that can be searched by the user. However, such interfaces are only useful if the user already has an idea about what kind of content they are interested in. Offbeat, unusual, or difficult to categorize media programs, for example, would be difficult to find with such interfaces.

Automatic content selection or recommendation may be used to find programs likely to be of interest to particular users, but such methods may be subject to certain limitations. Certain methods may require information about the user or the user's interests, for example past viewing history or user profile information, for use in selecting content or making content recommendations. Consequently, such methods may require that the user connecting to a content distribution system be identified for the method to be useful. However, a significant portion of people viewing video content online may not wish to be identified. Requiring all users to identify themselves before gaining access to online content may be counter-productive to the objective of obtaining the largest possible audience for promotion of advertising or other content. Therefore, some prior methods for automatic content selection or recommendation may not be effective in environments where the identities of a substantial portion of users are unknown, for example, when a user is not logged in or otherwise identified. These and other limitations of prior automatic content selection or recommendation methods may be overcome by the novel methods and apparatus disclosed herein.

SUMMARY

Methods, apparatus and systems for ad selection and video recommendation for connected clients connected to a video streaming system without using a user identity-based parameter, e.g., when the user identity is unknown or undefined, are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for determining a sequence of video programs playing on an interactive player device may be performed by a computer server, in cooperation with the interactive player. The method may include streaming a first video program including an ad break from the computer server to an interactive player device in a first streaming session. The method may further include, during the first streaming session, the server automatically selecting a video advertisement from a set of prospective video advertisements for play during the ad break, based at least in part on the first video program exclusive of any parameter based on user identity. The method may further include providing the video advertisement to the interactive player device in the first streaming session at the ad break.

In an aspect, the method may further include automatically selecting a second video program from a set of prospective video programs, based at least in part on the first video program exclusive of any parameter based on user identity. For example, the selection may be made based solely on attributes of the current session with the interactive player device and attributes of each program in the set of prospective video programs.

In another aspect, the method may include associating the video advertisement with an interactive object for indicating user selection of the second video program. In such embodiments, the method may include receiving a signal from the interactive player device indicating the user selection of the second video program. In addition, the method may include detecting a completion of the first streaming session on the player device, for example by receiving a signal from the player device. The method may further include automatically initiating a second streaming session to the interactive player device including the second video program conditioned on receiving the signal and detecting the completion of the first streaming session. In an aspect, automatically initiating the second streaming session may be performed immediately after the completion of the first streaming session without waiting for further user input.

In more detailed aspects of the method, automatically selecting the second video program may be further based on a popularity of each program in the set of prospective video programs. In such cases, the method may include determining the popularity for each program within a recent time period. In another example, automatically selecting the second video program may be further based on a rate of increase in popularity of each program in the set of prospective video programs.

In yet another example, automatically selecting the second video program may be based on a subscription status determined for the streaming session. In the alternative, or in addition, automatically selecting the video advertisement from the set of prospective video advertisements may be based on a priority order of candidates in the set based on ad type.

In related aspects, a client-side or server-side computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, smart phones, notepad computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for ad selection and video recommendation for connected clients exclusive of a user identity-based parameter are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology. Like element numerals may be used to indicate like elements appearing in one or more of the figures.

FIGS. 12-15 are diagrams illustrating operations that may be performed by a server system in connection with next ad and/or next content selection based on session analysis without using a user identity-based parameter.

DETAILED DESCRIPTION

Figure 1:
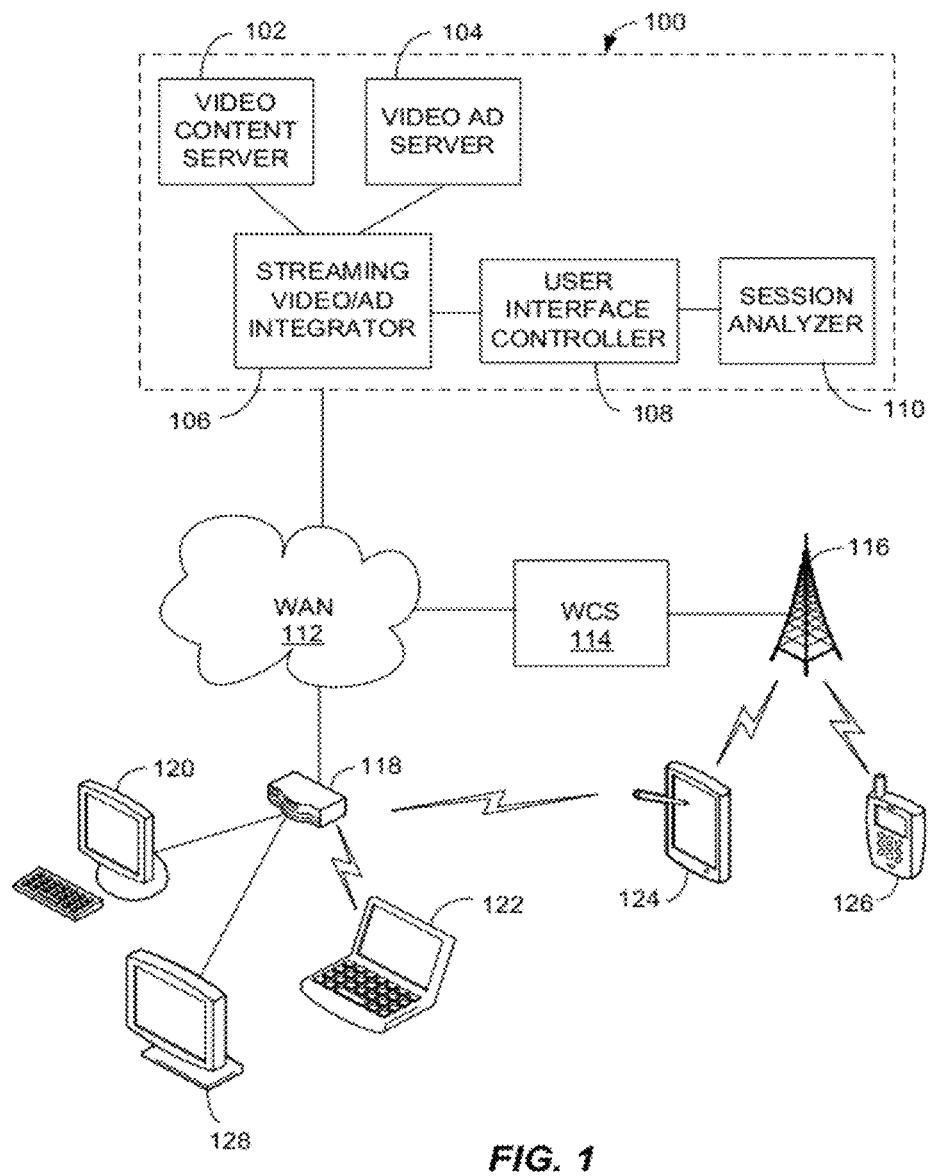
FIG. 1 is a schematic diagram illustrating an embodiment of a computing environment in which systems and methods discussed herein may be implemented.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Features and aspects as disclosed herein may be implemented within a system including a video streaming system 100 in communication with multiple client devices via one or more communication networks. The video streaming system 100 may include one or more computer servers or modules 102, 104, 106, 108 and/or 110 distributed over one or more computers. Each server 102, 104, 110 may include, or may be operatively coupled to, one or more data stores, for example databases, indexes, files, or other data structures. A video content server 102 may access a data store of various video programs; for example, television episodes, motion pictures, and other content produced as primary content of interest to consumers. The video content server 102 may serve the video programs as directed by a user interface controller module 108.

A video advertising server 104 may access a data store of relatively short video segments (e.g., 10 second, 30 second, or 60 second video advertisements) configured as advertising for a particular advertiser or message. The advertising may be provided for an advertiser in exchange for payment of some kind, or may comprise a promotional message for the system 100, a public service message, or some other information. Short videos used for promotional purposes or information without payment from a sponsor may sometimes be referred to as "house ads." A house ad may be tagged with an indicator to that is can be distinguished from paid advertising by the server system 100. Further tagging may be used to distinguish different types of house ads. Paid advertising may be handled using a set of rules at least partly determined by terms of an advertising agreement or contract with the advertiser. Because house ads are not subject to an advertising agreement, house ads may be handled by the system 100 using a different set of rules. The ad server 104 may serve the video advertising segments as directed by the user interface controller 108.

A session analysis component 110 may be called by the system 100 for video streaming sessions in which a specific user account is not identified. A video streaming system that is open to non-subscribers, such as for example an advertising-supported system, may support video streaming to a client device without identifying a specific user account for the video streaming session. Such sessions may sometimes be referred to as "anonymous sessions." The system 100 may (or may not) identify a client device participating in an anonymous session, but has insufficient information for identifying a particular user for which the system maintains account information. The session analysis component may track a history of an anonymous session, including web pages browsed, video watched, and ads or other objects selected by the anonymous user during the session. Optionally, the sessional analysis may estimate a demographic profile of the anonymous user based on the session history.

The video streaming system 100 may further include an integrator component 106 that integrates video content and video advertising into a streaming video program as directed by the controller 108. The controller 108 may determine the selection or configuration of advertising in the streaming video based on algorithms or processes as described herein for next video ad selection or next video content suggestion and selection. In next ad selection, the controller 108 may select an ad for streaming in a future ad slot of a streaming video. In next video content selection, the controller 108 may select a suggested video content title based on the session analysis during streaming of a first video, without using a user identity. The controller 108 may cause the suggested title to be provided to the client for presentation to the user. In response to a signal from the client indicating user acceptance of the suggestion, the controller 108 may stream the suggested video to the client upon termination of the first video. The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 116 and/or other network 114. Such client devices may include, for example, one or more laptop computers 122, desktop computers 120, "smart" mobile phones 126, notepad devices 124, network-enabled televisions 128, or combinations thereof. Each of the client devices may be communicatively coupled to the video streaming system 100 via a router 118 for a LAN, via a base station 116 for a wireless telephony network 114, or via some other connection. In operation, such client devices 120, 122, 124, 126, 128 may send and receive data or instructions to the system 100, in response to user input received from user input devices or other input. In response, the system 100 may serve video programs, selected advertising and next video content to the client devices 120, 122, 124, 126, 128. The devices 120, 122, 124, 126, 128 may output video from the streaming video program using a display screen, projector, or other video output device. In certain embodiments, the system 100 in accordance with the features and aspects disclosed herein may be configured to operate within or support a cloud computing environment. For example, a portion of, or all of, the servers 102, 104 or 110 may reside in a cloud server.

Figure 2:
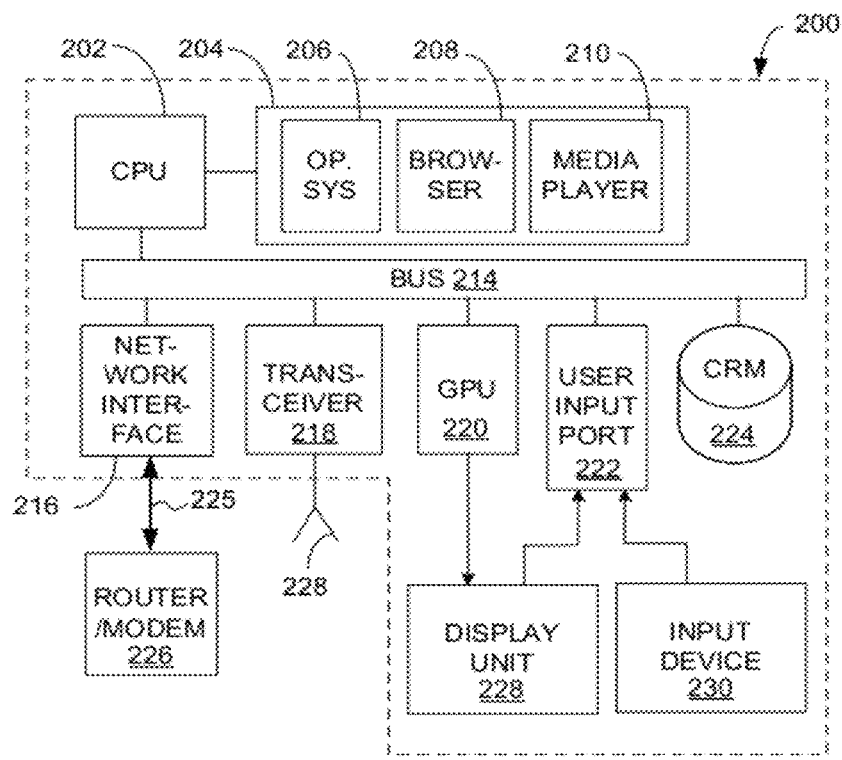
FIG. 2 is a schematic block diagram illustrating another embodiment of a computer system for supporting and executing the systems and methods described herein.

Referring to FIG. 2, a diagrammatic view of an example client device 200 is illustrated. One or more of the client devices 120, 122, 124, 126, 128 shown in FIG. 1 may be configured as or include such a client device 200, which may also be referred to as a computer, media player device, client, or client computer. In selected embodiments, the client device 200 may include a processor 202 operatively coupled to a processor memory 204, which holds binary-coded functional modules for execution by the processor 202. Such functional modules may include, for example, an operating system 206 for handling system functions such as input/output and memory access, a browser 208 for accessing information via the World Wide Web or similar network infrastructure, and a media player 210 for playing streaming video and communicating with a streaming video system. The memory 204 may include other functional modules, for example, modules for communicating with a server system, receiving user input, or displaying video output, as described in more detail herein below.

A bus 214 or other communication component may support communication of information within the computer 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, and 210 when the client device 200 is powered off, from which the modules may be loaded into the processor memory 204 when the client 200 is powered up. The storage device 224 may include a non-transitory computer-readable medium holding information, instructions, or some combination thereof, for example instructions that when executed by the processor 202, cause the client device 200 to perform one or more client-side operations of a method as described herein.

A communication interface 216 may also be connected to the bus 214. The communication interface 216 may provide or support two-way data communication between the client device 200 and one or more external devices, e.g., the streaming system 100, optionally via a router/modem 226 and a wired or wireless connection 225. In the alternative, or in addition, the client device 200 may include a transceiver 218 connected to an antenna 228, through which the client 200 may communicate wirelessly with a base station for a wireless communication system or with the router/modem 226.

The client device 200 may be connected (e.g., via the bus 214 and graphics processing unit 220) to a display component 228. A display component 228 may include any suitable configuration for displaying information to a user of the client device 200. For example, a display component 228 may include or utilize a cathode ray tube (CRT), liquid crystal display (LCD), touchscreen LCD (e.g., capacitive display), light emitting diode (LED) display, projector, or other display device to present information to a user of the client device 200 in a visual display.

One or more input devices 230 (e.g., an alphanumeric keyboard, microphone, keypad, remote controller, game controller, camera or camera array) may be connected to the bus 214 via a user input port 222 to communicate information and commands to the client 200. In selected embodiments, an input device 230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 228, for example using a touch sensitive screen. A cursor control device may communicate direction information and command selections to the processor 202 and control cursor movement on the display 228. A cursor control device may have two or more degrees of freedom, for example allowing the device to specify cursor positions in a plane or three-dimensional space.

The client device 200 may be used to transmit, receive, display, or otherwise process one or more streaming video programs. In selected embodiments, such transmitting, receiving, and displaying may be in response to the processor 202 executing one or more sequences of one or more instructions contained in main memory 204. Such instructions may be read into main memory 204 from another non-transitory computer-readable medium (e.g., a storage device 224).

Execution of sequences of instructions contained in main memory 204 may cause a processor 202 to perform one or more of the procedures or steps described herein. In selected embodiments, one or more processors 202 in a multi-processing arrangement may also be employed to execute sequences of instructions contained in main memory 204. Alternatively, or in addition thereto, firmware may be used in place of, or in combination with, software instructions to implement procedures or steps in accordance with the features and aspects disclosed herein. Thus, an apparatus embodying the features and aspects disclosed herein is not limited to any specific combination of hardware circuitry and software.

The term "non-transitory computer-readable medium" as used herein may refer to any medium that participates in holding instructions for execution by a processor 202, or that stores data for processing by a computer. Such a medium may take many forms, including but not limited to, non-volatile media, volatile media, and temporary storage media (e.g., cache memory). Non-volatile media may include optical or magnetic disks, such as a storage device 224. Volatile media may include dynamic memory, such as main memory 204. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, any other memory card, chip, or cartridge, or any other memory medium from which a computer can read.

Figure 3A:
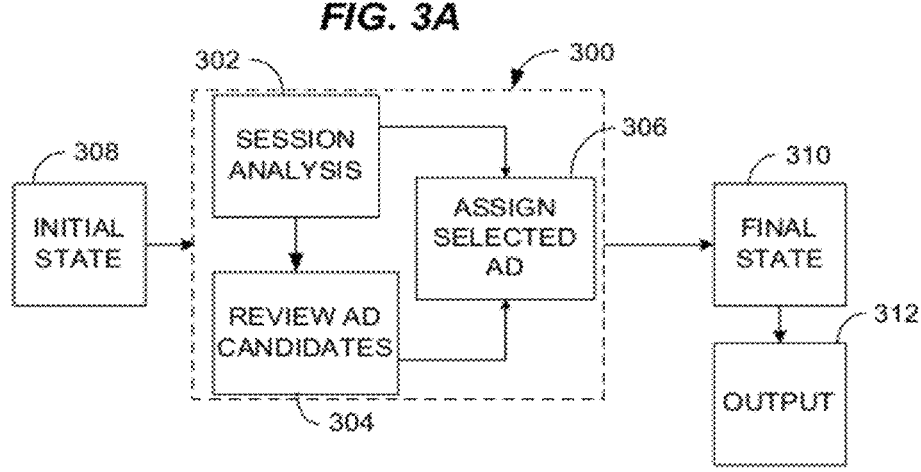
FIG. 3A is a schematic block diagram illustrating an embodiment of a system for next ad selection in a video streaming system based on session analysis without using a user identity-based parameter.

Referring to FIG. 3A, general aspects of a video ad selection process 300 used for selection of advertising provided to a client device based on, or in relation to, a streaming video session on the client device are illustrated as a state diagram. The initial state 308 represents a set of possible advertising segments (e.g., house ads) for providing to client devices to be played in an ad slot of a video streaming program. For example, numerous house ad candidates may be stored in system memory and available to fill an available slot in a streaming video program, which is not scheduled to be filled by a paid (sponsored) ad. The initial state 308 may be represented in a computer memory in various ways, for example by a list of house ad identifiers or links each identifying a network address for respective ones of the house ads, and optionally the content itself in digital form, associated with an identifier for a streaming video advertisement. It should be apparent that the initial state 308 may be defined by data that represents prospective house ads to be displayed during an available ad slot of a video program playing on the client devices. As such, the initial state data 308 represents multiple alternative physical states of a video output device that may be achieved at a later time when the one or more of the house ads is displayed or output on a client device.

The customization process 300 is (or includes) an input-output computation process performed by a computer processor, which operates on the initial state 308 to produce a final state 310 initially embodied in a memory of a computer server. The final state 310 can be manifested as physical output by transmitting to a client device, where it may be output 312 using the display device coupled to (or part of) the client. The customization process 300 may therefore operate as a state machine that accepts the initial state 308 and optionally user input via an input device as inputs, and transforms the state data 308 representing many possible physical states of a video output device into a definite final state 310.

The customization process 300 may include several interactive modules, for example, a session analysis module 302, a reviewing module 304 and an assignment module 306. The process 300 may include other modules, for example, a user interface module, tracking module, graphics module, etc., which for illustrative simplicity are not shown.

The session analysis module 302 may analyze attributes of an anonymous streaming session. The session may include web browsing activity conducted by the client on a website hosted by the video streaming server before, during, or after actual video streaming to the client. The attributes may include, for example, an identity of one or more primary video programs requested or browsed during the session, and correlated viewing statistics of the one or more video programs to viewer demographic profiles or to other video programs; for example, X % of people who watch "Program 'A'" also watch "Program 'B'", or X % of people who watch "Program 'A'" are females between the ages of 21 and 34, etc. For further example, the attributes may include browsing history during the session, advertisements selected, or other behavior correlated to user interests or demographic profiles. Characteristically, the attributes may exclude personal identifying information for the person operating the client device, or for a user account. The module 302 and process 300 are therefore operable in the absence of any such identifying information. The module 302 may obtain relevant attribute information, for example, by tracking client interactions during the session, identifying video content or other content selected or viewed during the session, and looking up correlated viewing statistics in a system database.

The reviewing module 304 may identify a set of candidate house ads or other video segments suitable for playing in the available ad slot, based on the session analysis output 302. The reviewing module 304 may maintain a database of all currently available house ads for filling any available ad slot. To identify a candidate set for a particular streaming session, the reviewing module may apply attribute information from the session analysis to eliminate unsuitable house ads. For example, if the attribute information indicates a Spanish-speaking consumer, the reviewing module may filter out (remove) house ads for other language speakers. Similar filtering may be performed based on demographic correlations; for example, if the session attributes correlate to a young female demographic, house ads for older males may be filtered out. Another filter characteristic may be house ads previously viewed during the session. Output from the reviewing module 304 may include data indicating a reduced set of candidate house ads.

The assignment module 306 may receive inputs from the session analysis module 302 and reviewing module 304, and use those inputs to assign a particular video segment to be played in the available ad slot. The assignment module 306 may use one of various selection algorithms, including but not limited to hierarchical ranking of the set based on definite criteria, quasi-random selection, or additional filtering based on attribute data from session analysis, to select a single one of the candidate house ads. Characteristically, like the other modules 302 and 304 in the process 300, the module 306 may exclude any use of personal data identified with a particular user or account, in making a selection. Once the single house ad is selected, the selection may be stored as a memory state 310, which may in turn cause a specific display output 312 of the selected house ad.

Figure 3B:
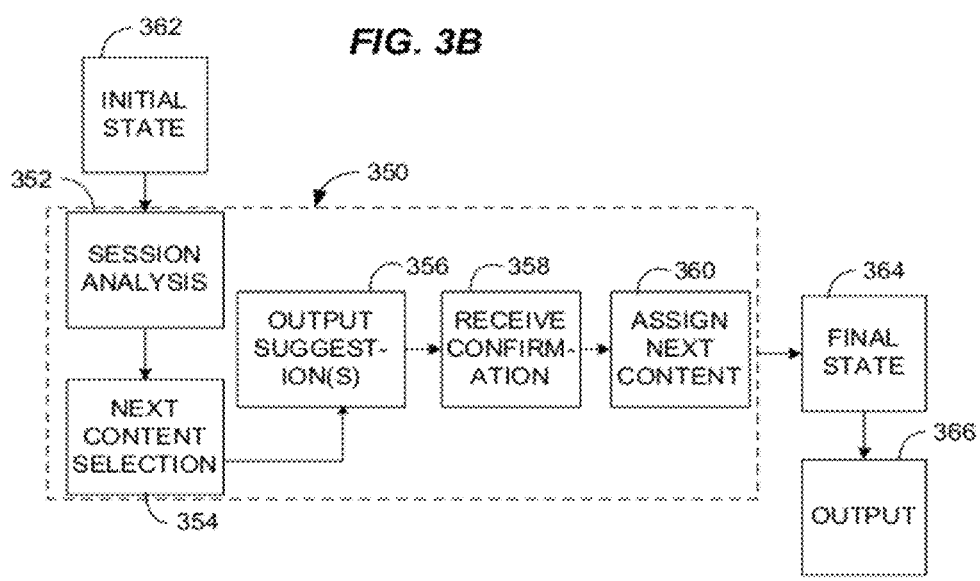
FIG. 3B is a schematic block diagram illustrating an embodiment of a system for next video suggestion and selection in a video streaming system based on session analysis without using a user identity-based parameter.

Referring to FIG. 3B, general aspects of a next video program selection process 350 used for selection of a subsequent (next) video program to be provided to a client device based on, or in relation to, a streaming video session on the client device are illustrated as a state diagram. The initial state 362 represents a set of possible next video programs for providing to a client device to be played after a currently streaming video program is finished or terminated. For example, a set of initial programs may include an entire library of video content, or library index, for programs available to unidentified users. The initial state 362 may be represented in a computer memory in various ways, for example by an index or list of video programs, or links each identifying a network address for respective ones of the programs. It should be apparent that the initial state 362 may be defined by data that represents a library of video programs available for streaming delivery during a streaming video session to a client device operated by an unidentified user. As such, the initial state data 362 represents multiple alternative physical states of a video output device that may be achieved at a later time when the one or more of the streaming video programs is displayed or output on a client device.

The selection process 350 is (or includes) an input-output computation process performed by a computer processor, which operates on the initial state 362 to produce a final state 364 initially embodied in a memory of a computer server. The final state 364 can be manifested as physical output by transmitting to a client device, where it may be output 366 using the display device coupled to (or part of) the client. The customization process 350 may therefore operate as a state machine that accepts the initial state 362 and optionally user input via an input device as inputs, and transforms the input state data 362 representing alternatives for possible physical states of a video output device into a definite final state 364.

The customization process 350 may include several interactive modules, for example, a session analysis module 352, a next content selection module 354, suggestion output module 356, a confirmation module 358, and an assignment module 360. The process 350 may include other modules, for example, a user interface module, tracking module, commerce module, graphics module, etc., which for illustrative simplicity are not shown.

The session analysis module 352 may analyze attributes of an anonymous streaming session. Functionality of the sessional analysis module 352 may be the same as, or similar to, functionality of the session analysis module 302 already described in connection with FIG. 3A.

Referring again to FIG. 3B, the next content selection module 354 may identify a set of video programs suitable for streaming to the client device after a currently streaming program is finished or terminated, based on the session analysis output 352. The next content selection module 354 may maintain a database of all currently available video programs for streaming to an unidentified user, which may include a library of programs qualified for distribution to non-subscribers. To identify a candidate set for a particular streaming session, the next content selection module may apply attribute information from the session analysis to eliminate unsuitable video programs. For example, if the attribute information indicates a English-speaking consumer, the next content selection module may filter out (remove) video programs for other language speakers. Similar filtering may be performed based on demographic correlations; for example, if the session content correlates to a older male demographic, video programs viewed primarily by younger females may be filtered out. Another filter characteristic may be video programs previously viewed during the session. Output from the next content selection module 354 may include data indicating a reduced set of candidate video programs.

The suggestion output module 356 may receive inputs from the session analysis module 352 and next content selection module 354, and use those inputs to assign a particular video program as a suggested next program to be streamed to the client immediately (or soon) after the current program is finished. The suggestion output module 356 may use one of various selection algorithms, including but not limited to hierarchical ranking of the set of video programs based on definite criteria, quasi-random selection, or additional filtering based on attribute data from session analysis, to select a single one of the candidate video programs. Characteristically, like the other modules 352 and 354 in the process 350, the module 356 may exclude any use of personal data identified with a particular user or account, in making a selection.

A confirmation module 358 may communicate with the client device to confirm user acceptance of the selected video program. If the client device does not confirm acceptance of the selected video program, the process 350 may be terminated, or an alternative video program may be selected by the content selection module 354. In alternative embodiments, the confirmation module 358 may be omitted such that the selected video program is automatically queued for playing next without user confirmation.

An assignment module 360 may implement a selected and confirmed video program for streaming to the client device immediately after the current video program is finished. This may include, for example, transmitting a signal to the client device to activate "continuous play" at the client, causing an identifier for the selected video program to be saved in a reserved memory location. Once the single video program is selected, confirmed and assigned, the final state may be realized as a memory state 364 in the server and/or client for a specific display output 366. Once the present video program is finished, the server and/or client may access the memory state 366 to cause display of the selected video program on the client device; for example, the client device may request the selected video program from the server upon termination of the prior program, or shortly before the termination.

Figure 4:
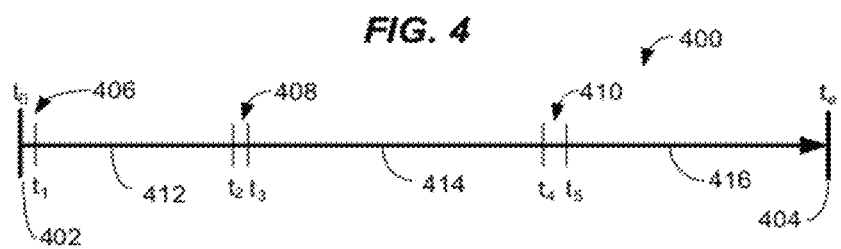
FIG. 4 is a schematic view of a video timeline showing predefined ad slots.

FIG. 4 is a line diagram illustrating aspects of a video program timeline 400 including ad slots 406, 408 and 410. A video program includes video data characterized by a sequence of video frames that are output in order at a defined frame rate to generate video output. As such, a video program includes an initial or first frame at inception time "$t_0$" 402 of video output, and each subsequent frame is output at a defined time "t" after inception until a terminal or end time "$t_e$" 404. Any non-negative, integral number of ad slots 406, 408 and 410 may be configured in the video time line. Each ad slot may be defined by a location and duration. For example, the first ad slot 406 is located at "$t_0$" and has a duration of "$t_1-t_0$"; the second ad slot 408 is located at "$t_2$" and has a duration of "$t_3-t_2$"; and the third ad slot 410 is located at "$t_4$" and has a duration of "$t_5-t_4$". The inter-slot portions 412, 414 and 416 are used for playing requesting video content, and the ad slots are used for playing video advertisements or house ads. A streaming media player operating on the client device may cause the video content to play in the defined inter-slot portions 412, 414, 416 and stream advertising videos or house ads of appropriate duration in all of the ad slots 406, 408, 410.

Figure 5:
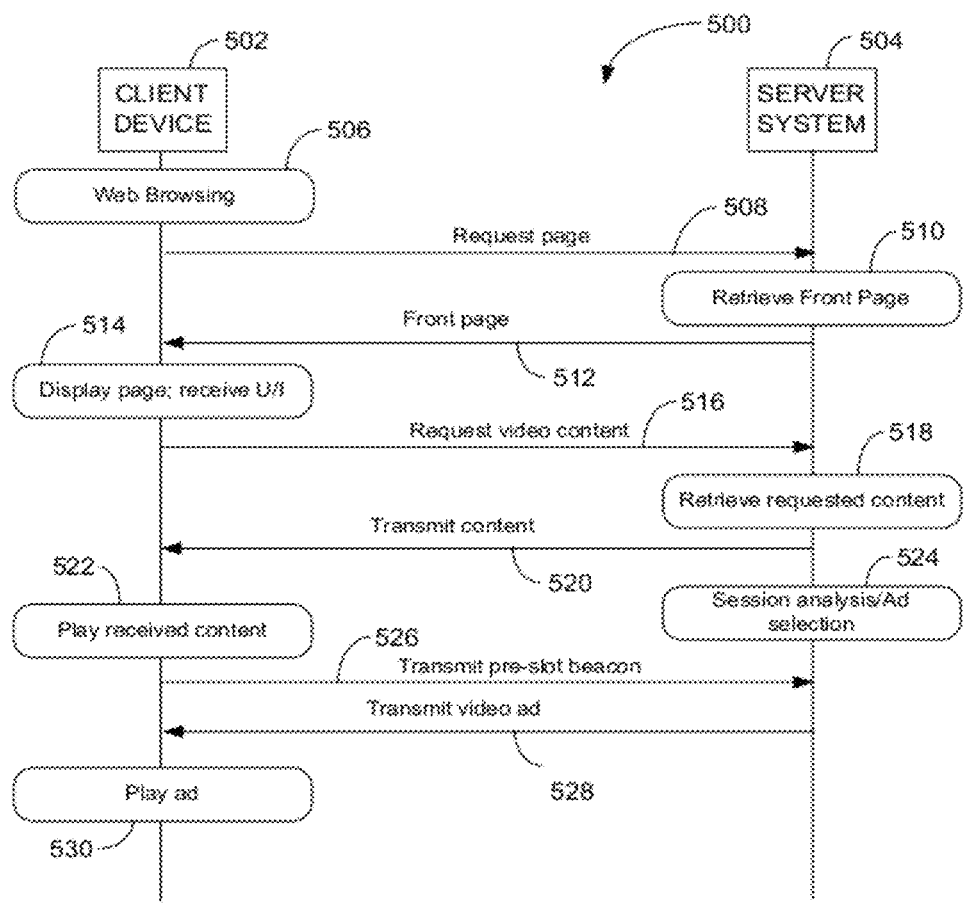
FIG. 5 is a sequence diagram illustrating an example of a call flow between a video server system and a video player client executing a method for next ad selection based on session analysis without using a user identity-based parameter.

FIG. 5 illustrates an example of a call flow 500 between a server system 504 and a client device 502 for selecting a house ad or other advertising message based on a session analysis exclusive of identifiable user information. The server 504 and the client device 502 may each be, or may include, a computing device including one or more processors coupled to a memory and other components as described in more detail herein, or as known in the art. The call flow 500 assumes video streaming is provided through a web page interface and streaming media player installed at the client device; however, the inventive concepts herein are not limited to such environments. If a web page environment is used, a call flow may initiate with the client device 502 performing a web browsing operation 506 and requesting 508 a web (e.g., World Wide Web) page from the server system 504 with links for requesting one or more video programs. The server system may retrieve a requested page 510 and serve it 512 to the client 502. For example, the web page may comprise a "home" or page including a list of selected video programs of general interest. The client device may display the page and receive user input 514 selecting one of the links, for example, a "point and click" input from a pointing device, a touch input on a touchscreen device, or a spoken command. In response to the input, the client device may, as shown at 516, request a specific video program by transmitting a Hypertext Transfer Protocol (HTTP) "get" request, or other suitable request message, to the server system 504. The client may also activate a media player component at the client device 502, in preparation for receiving the requested video content. The client device need not be required to identify a particular user or user account to receive the front page or streaming video. Therefore the server 504 may have no information concerning the user receiving the video.

At 518, the server may retrieve requested video program 518 and initiate a streaming session with the client 502 by streaming 520 the video program configured as a sequence of video data packets to the media player component on the client 502, using any suitable streaming protocol, for example, Real Time Streaming Protocol (RTSP). The video program when configured as streaming video may include one or more predefined ad slots. Using the local media player component, the client device may play the streaming video content to produce a local video output on a display device. Between the time of the page request 508 and the time the one or more ad slots are reached during play of the video content, the server 504 may perform a session analysis and ad selection process 524, which may operate without using any user profile or other information tied to a user identity. An example of a session analysis and ad selection process is described below in connection with FIG. 7. An output of the process 524 may include an identifier for one or more video advertisements, for example, one or more house ads. In some embodiments, the process 524 may be used exclusively for selection of house ads. Thus, if no empty ad slots are available for house ads, the process 524 may be omitted and a different process used to select paid advertising. During the analysis and selection process, the client device 502 may play the video program 522 up until an available ad slot is reached.

Shortly (e.g., between about 0.5-5 seconds) before the available ad slot is reached on the client device 502, the client may transmit 526 a pre-slot beacon (signal) to the server 504. The pre-slot beacon alerts the server that the client is almost ready to play a video advertisement selected by the server for the available ad slot. The use of the beacon is not required, but may reduce inefficient use of bandwidth by increasing the probability that streamed advertising will be played on the client and viewed by the user. If the advertising is provided to the client too early (e.g., near the beginning of the video program), the probability that the user will terminate the program before the advertising is viewed may be greater. At 528, the server may stream the video ad to the client device. At 530, the client device may play the received video ad during the available ad slot, and when finished playing the ad, continue playing the video program or terminate the video program. In addition, when the ad has completed playing, the client may transmit an end beacon to the server 504, signifying that the advertisement was played on the client device.

Figure 6:
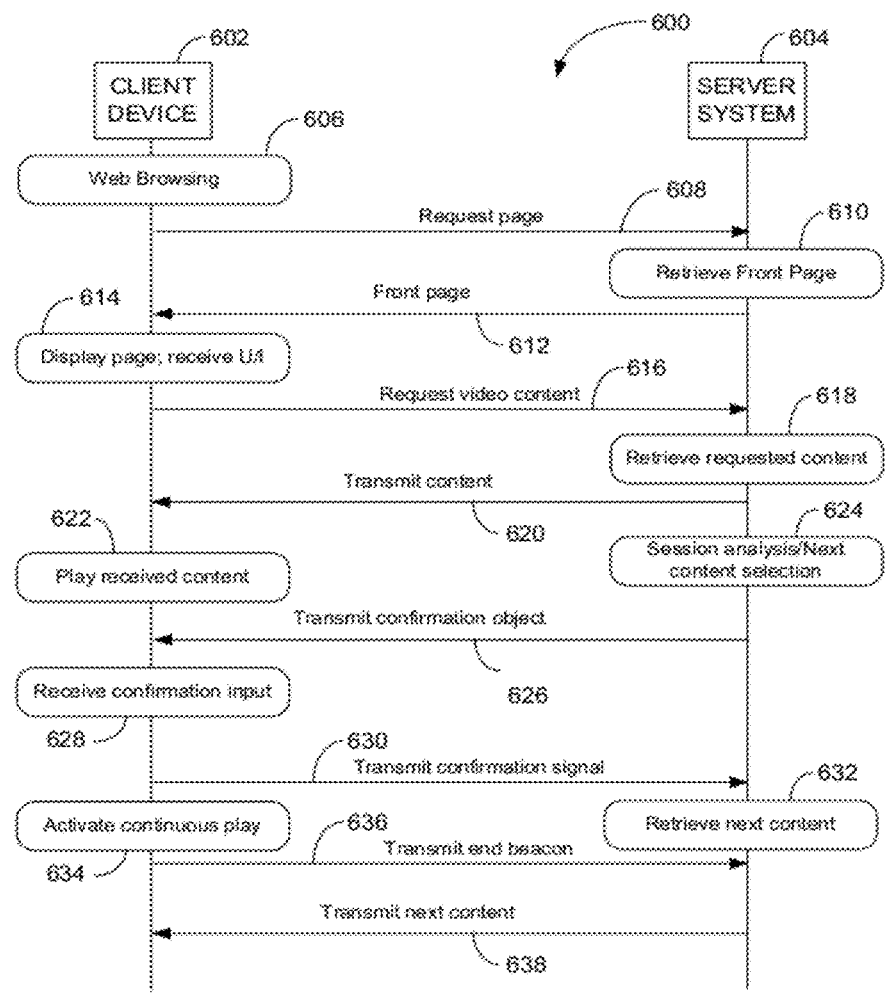
FIG. 6 is a sequence diagram illustrating an example of a call flow between a video server system and a video player client executing a method for next video suggestion and selection based on session analysis without using a user identity-based parameter.

FIG. 6 illustrates an example of a call flow 600 between a server system 604 and a client device 602 for selecting a next video program based on a session analysis exclusive of identifiable user information. The server 604 and the client device 602 may be the same as the server 504 and client device 502 described above. Again using a web environment as an example, a call flow may initiate with the client device 602 performing a web browsing operation 606 and requesting 608 a web (e.g., World Wide Web) page from the server system 604. The web page may be any page available from the server system 604 that includes at least one link for requesting one or more video programs. The server system may retrieve the requested page 610 and serve it 612 to the client 602. The client device may display the page and receive user input 614 selecting one of the links, for example, a "point and click" input from a pointing device, a touch input on a touchscreen device, or a spoken command. In response to the input, the client device may, as shown at 616, request a specific video program to the server system 604 and activate a media player component as previously described for the advertising call flow 500. In an aspect, the client device is not required to identify a particular user or user account to receive the front page or streaming video. Therefore the server 604 may have no record of information concerning the user requesting or receiving the video program.

At 618, the server may retrieve the requested video program 618 and initiate a streaming session with the client 602 by streaming 620 the video program to the client 602 as previously described. The client device may play 622 the streaming video content to produce a local video output on a client display device. Prior to completion of the video program playing on the client device, the server 604 may perform a session analysis and next content selection process 624, which may operate without using any user profile or other information tied to a user identity. An example of a session analysis and next content selection process is described below in connection with FIG. 8. An output of the process 624 may include an identifier for a next video program identified as likely to be of interest to the user. By correctly identifying video programs of interest to an unknown user, the, the process 624 may provide the benefit of keeping the user engaged with the video server for longer than would otherwise be the case.

Figure 9:
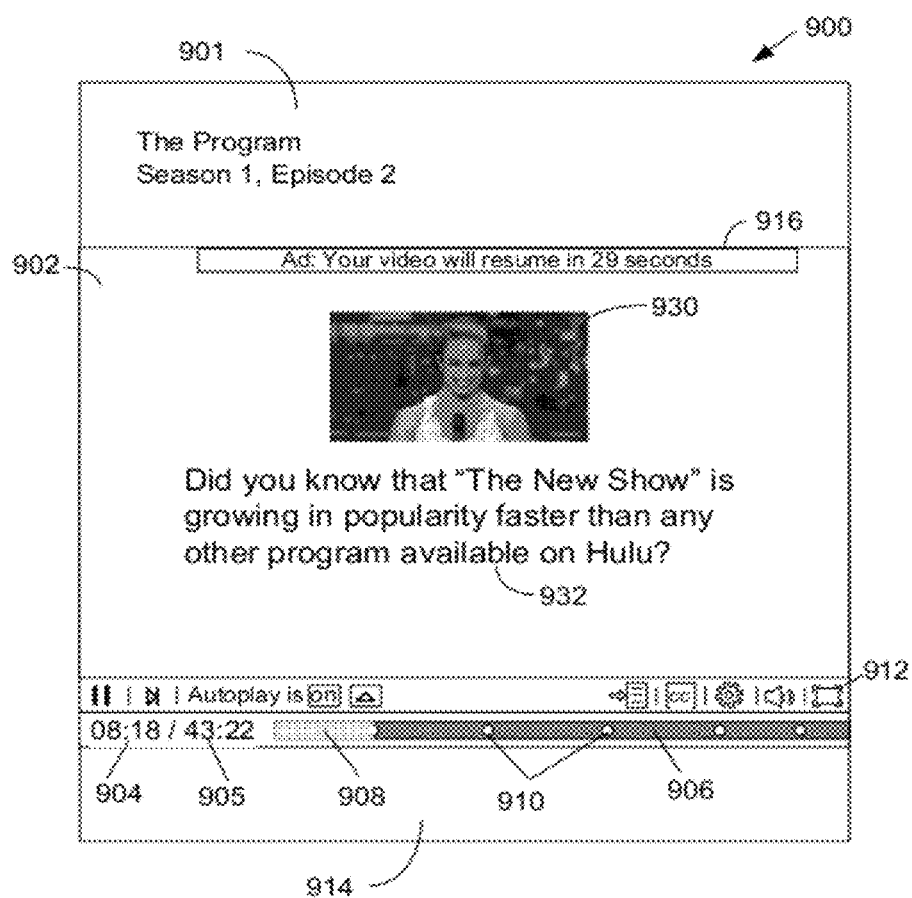
FIGS. 9-11 are diagrams illustrating simplified screenshots of a user interface enabling next content suggestion and selection based on session analysis without using a user identity-based parameter.
Figure 10:
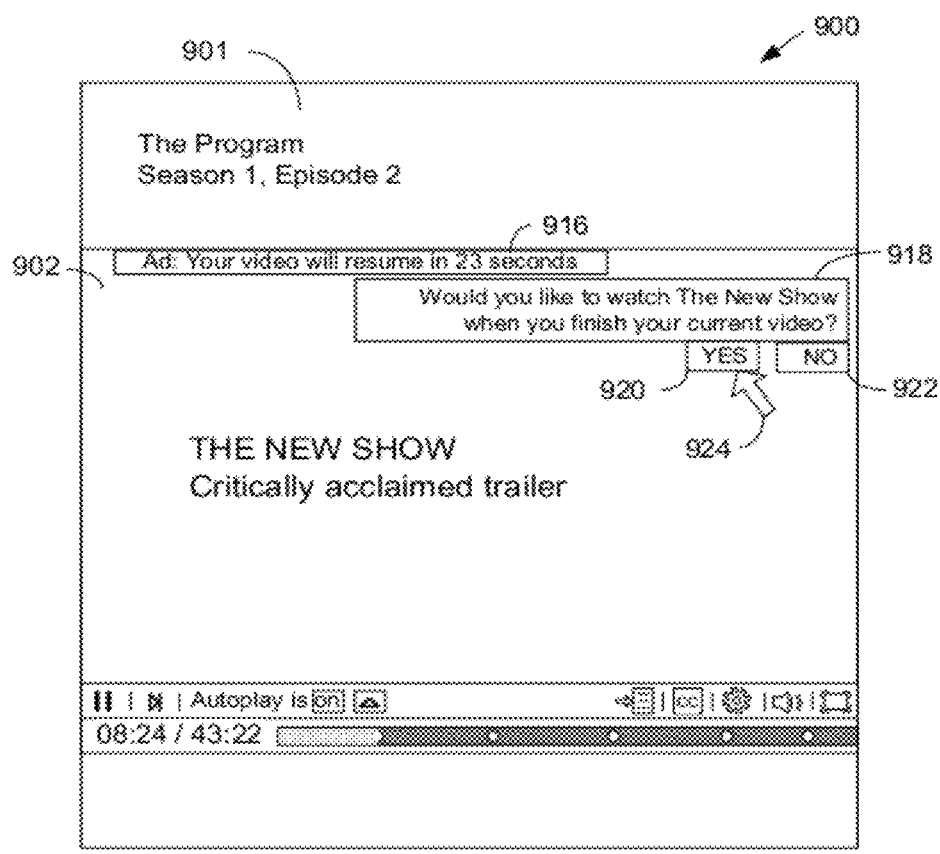
Figure 11:
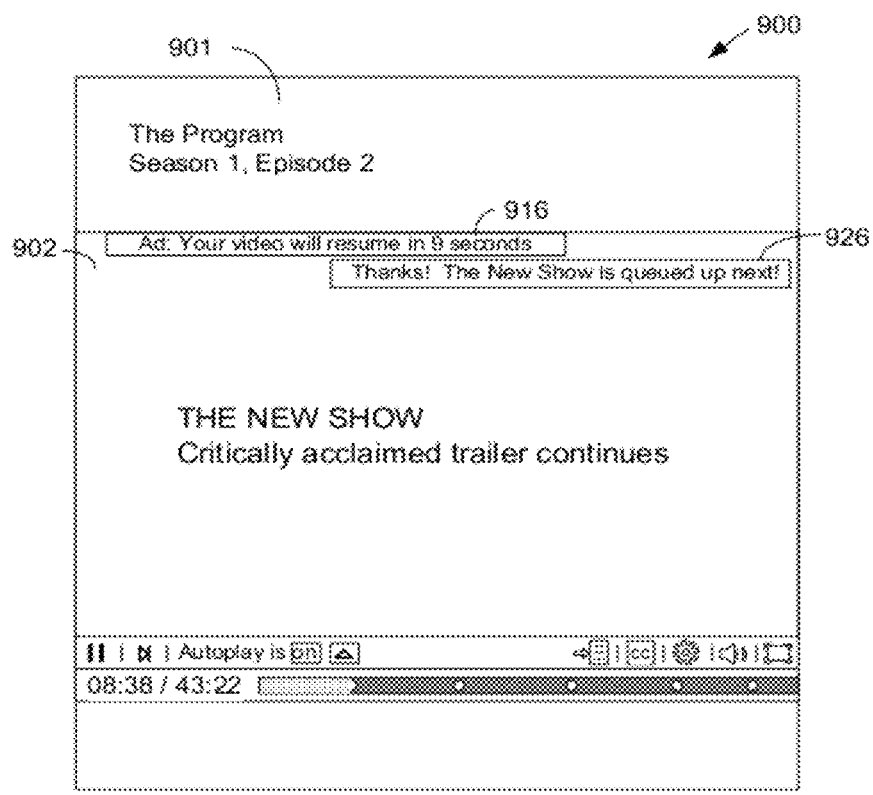

Once a next video program has been identified, the server 604 may transmit 626 information for configuring a confirmation object or message on the client 602. The information may include, for example, a graphic promoting the selected next video, for example a thumbnail image, a title of the program, program description, and other descriptive or promotional information regarding the selected program. The client 602 may receive the information and display a confirmation object with a presentation of the descriptive or promotional information on the client display. Examples of a confirmation object and accompanying displays are illustrated in FIGS. 9-11. In some embodiments, the client may display the confirmation object during play of a promotional trailer for the next video program. In turn, the client may play the promotional trailer during an available ad slot. It should be apparent that the promotional trailer may therefore make up part or all of a house ad of the server system 604 that is selected and played according to the call flow 500 illustrated in FIG. 5.

In response to the display of the confirmation object and related promotional information, the client 602 may receive user input 628 confirming the selection. If so, the client may transmit a signal 630 to the server 604. Optionally, the client may, automatically or in response to user input, activate a continuous play function 634. Once activated, the continuous play function causes the next video program to begin playing automatically shortly after the current video program finishes playing. It should be appreciated that the operations 628 and 634 may be performed while the first video program is playing on the client.

Shortly (e.g., between about 0.5-5 seconds) before finishing playing of the first requested video program on the client device 602, the client may transmit 636 a program end beacon (signal) to the server 604. The end beacon alerts the server that the client is almost ready to play the next video selected by the server for the available ad slot. At 638, the server may stream the selected and confirmed next video program to the client device. The client device may then play the next video, and the process 624-638 may be repeated until the client 602 terminates the session with the server.

Figure 7:
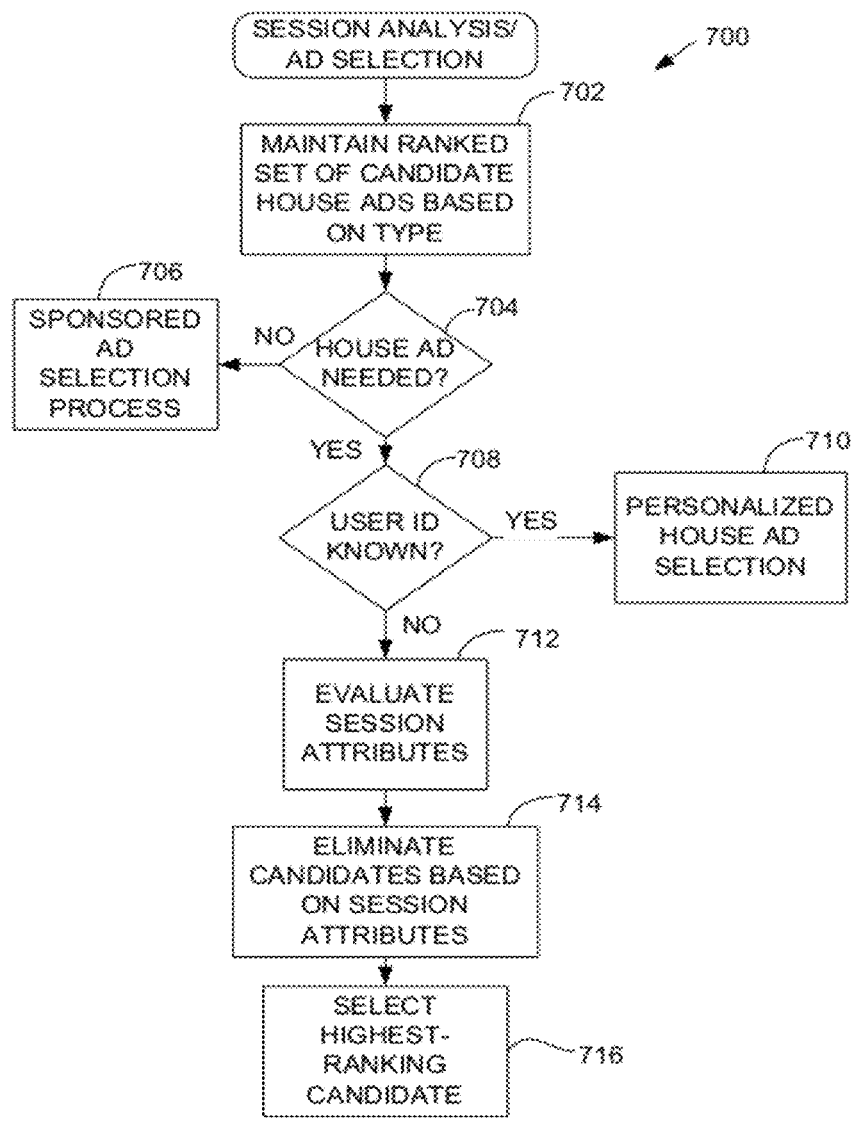
FIG. 7 is a flow chart illustrating aspects of an algorithm for session analysis and next ad selection.

Referring to FIG. 7, a server selecting a house ad for an unidentified user as described elsewhere herein may perform the process 700 for session analysis and ad selection. In an aspect, the server may maintain 702 a ranked set of candidate house ads based on ad (promo) type; that is, according to a defined hierarchy of types. For example, a hierarchy may prioritize ad types as follows:

1. Subscription promos
    2. Original and exclusive content promos
    3. Stunt promos
    4. Classic content promos
    5. Show promos (for specific shows)
    6. Genre (show collections) promos
    7. Information promos
    8. Event Promos
    9. Watch Next promos At any point in time the server may maintain a listing of house ads. Each ad may be assigned an ad type and prioritized according to a current type hierarchy, using a database or other data structure in the server memory. Each house ad may have or be assigned other attributes used in ad selection, for example, language or demographic profile of a target audience.

For any particular ad slot, the server may determine 704 whether a house ad is needed for the slot. In other words, the server may determine whether a particular slot is available for being filled by a house ad. If a house ad is not needed, the server may select 706 a sponsored ad according to other factors as known in the art. If a house ad is needed, the server may determine 708 whether a user identity is known. If the user identity is known, the server may select a house ad likely to appeal to the user, based on user profile and user interest data maintained in a computer memory.

If the user identity is unknown, the server may evaluate session attributes to infer information about the current user's video content interests. This may include determining a common or most probable demographic profile of the user based on the video program or programs viewed in the current session. Optionally, past sessions for which a record is available via a cookie or similar record stored on the client may similarly be analyzed. If user selection data for content besides video programs, for example, web ads or links, is available, such interest data may also be considered. From the available information of the current session, the server may develop session attribute information, which may be broadly described as interest or demographic profile information inferred for a user. For example, the session attributes may include a language (e.g., English, Spanish, etc.) identifier, apparent gender, apparent age range, and one or more genres of apparent interest.

At 714, the server may eliminate candidate house ads based on the session attributes. For example, the server may query a database of candidate house ads based on the session attributes, such that only candidates that match the session attributes are returned by the profile. The server may also eliminate candidates that have been recently played on the client device, for example ads played by the client device less than a defined number of ad slots (e.g., 1-6 slots) ago. The server may then rank the surviving candidates based on ad type, and at 716, select the highest-ranking candidate house ad. The server may then output an identifier of the selected house ad, or related information as previously described, as a output of the process 700.

Figure 8:
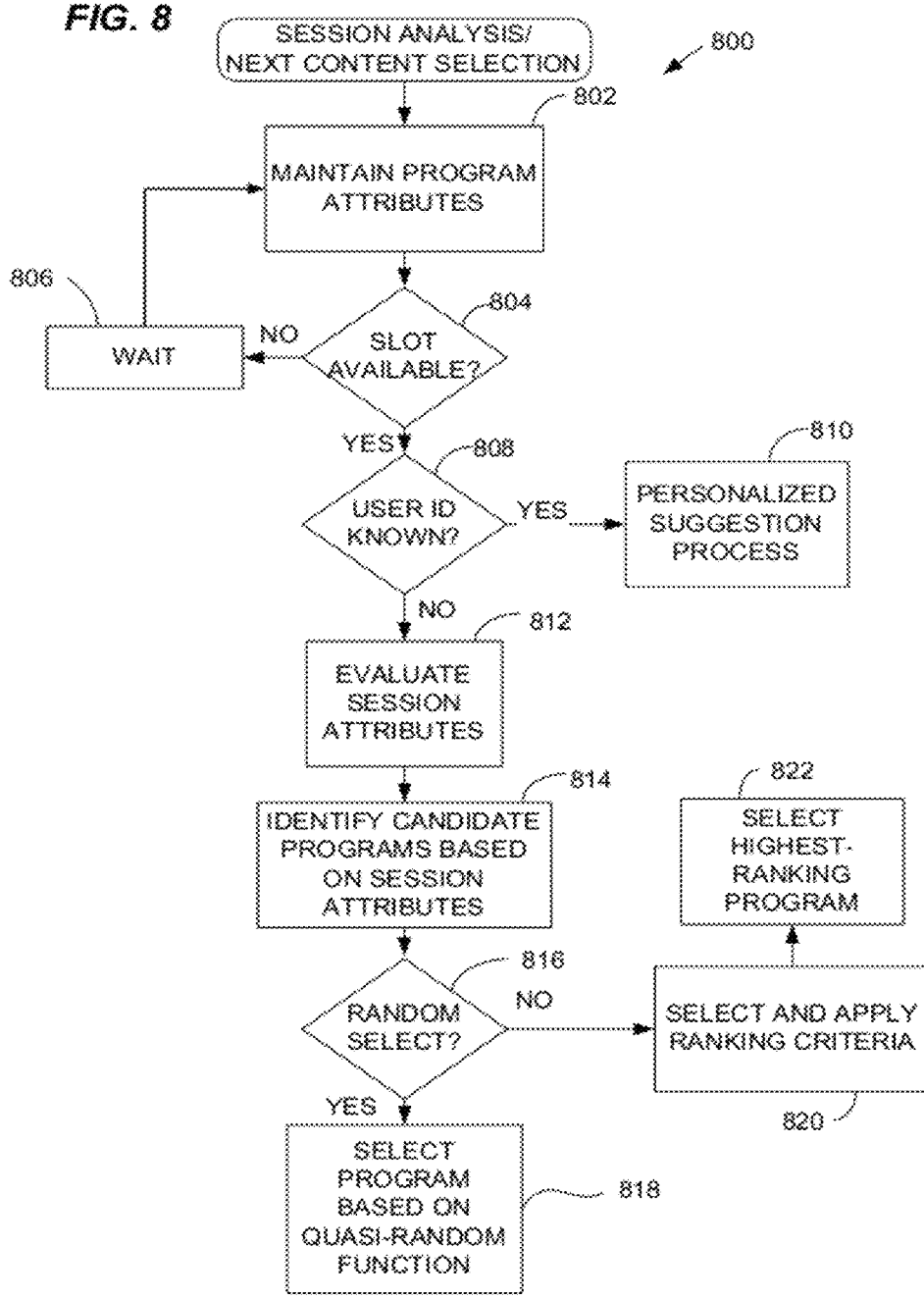
FIG. 8 is a flow chart illustrating aspects of an algorithm for session analysis and next content selection.

Referring to FIG. 8, a server selecting a house ad for an unidentified user as described elsewhere herein may perform the process 800 for session analysis and next video program selection. At 802, the server may maintain data defining video program attributes for each available program in its video library, or for some subset of its library. A library subset may be defined by, for example, content for non-subscribing users, or content for which a promotional house ad has been developed and is available in system memory. Program attributes may include, for example, popularity within a recent time period, "hotness," program length, original release date, genre, demographic target, system (host) indicated preferences, or other information. As used herein, "hotness" refers to the rate at which the popularity of a program is increasing; i.e., a measure of how "hot" the program is. Hotness may be measured by comparing popularity of the program in the two most recent measurement periods, and determining the rate of change between the periods. Any desired granularity may be used for the periods used to measure popularity or hotness, for example, an hour, several hours, a 24-hour period, a fraction of an hour, etc.

The process 800 may be called when a house ad promoting next content is needed. At other times, there may be no reason to identify a next program. Accordingly, at 804, the server may determine when an ad slot for a watch next house ad is available, for example by waiting 806 for a signal from a house ad selection process 700. If a watch next house ad is indicated by the selection module, the server may determine, at 808, if the user is identified. If the user is identified, the server may, at 810, use the identity and any associated user profile and interest data, to select personalized content likely to be of interest to the identified user. If the user is not identified, the server may evaluate session attributes at 812, for example as described at block 712 of process 700. If the process 700 is active for the client session, the server may obtain the session attributes evaluated at 712 from a computer memory.

At 814, the server may identify candidate video programs based on the session attributes. Initially, the server may eliminate candidate programs that are a poor match for the session attributes, for example using a query as previously described for process 700. However, in the program selection process 800, the query is designed to return identifiers for video programs, not for advertisements. After the process 814 the server may have identified a manageable number of candidate programs, a list of which may be truncated at a defined number if too large. As in process 700, recently selected candidates may be eliminated to prevent the same programs from being repeatedly selected.

In some embodiments, or in some instances, the process 800 may determine 816 whether or not to perform a random selection (i.e., selection based on a quasi-random function) from the candidate program list. Random selection as indicated at 818 may be useful for exposing users to a wider range of content than might otherwise happen. However, random selection may be less likely to identify the content most likely to be of interest to the unknown user, and therefore may be used only selectively, or not at all.

If random selection is not to be used, the server may select 820 one or more criteria by which to rank the candidate programs, and rank the candidates or identify the highest ranking candidate accordingly. For example, the server may select popularity, hotness, or some combination of popularity and hotness, or some other program attribute. The server may select different ranking attributes in different instances of the process 800. The server may then select 822 the highest-ranking candidate video program, and output an identifier for the selected candidate and other information as previously described as output of the process 800.

Referring to FIGS. 9 and 2, a client device 200 in accordance with the features and aspects disclosed herein may provide or support a graphical user interface 900 that may be used to play (e.g., output a display based on a sequence of video data) streaming video programs, advertising and related data. Although represented diagrammatically by the outline 900, it should be appreciated that the graphical user interface 900 may be embodied as an input/output module executing on a client device that receives user input and generates responsive output. The user interface 900 may generate and output a video player window 902 to a display device, optionally with supplemental display areas, for example an upper area 901 and a lower area 914 for display of other information. The video window 902 may include an image display portion displaying output frames of video data and a progress bar 906 indicating progress of the video program. For example, a progress bar 906 may include a progress indicator that automatically progresses (e.g., from left to right) during playing of a video file to indicate the current location of play.

The user interface module 900 executing in the client device may control the progress indicator 908 so that it moves in response to user input to change the location of play. The client device may include a tool bar 912 or other control feature in the window 902 to enable an unidentified user to control playback of a video file, to jump to a location within the video file, or the other video function. A tool bar 912 may include convenient commands to play, pause, stop, reverse, fast forward, fast reverse, or the like or combinations or sub-combinations thereof.

The client device may display a video portion of a video file in the image display portion of the video window 902, while a outputting corresponding audio portion of the video file synchronously on an audio output device, for example, speakers. The client device may indicate a current temporal location of a displayed video and audio content in relation to the other content of a video file using the progress bar 906. When paused, a current video still frame may be shown, essentially freezing a video presentation, audio presentation, or both.

In selected embodiments, the client device may progress a sequence of video frame presented in an image display portion of the video window 902 in response to user input indicating movement of the progress indicator 908 to a new position along the progress bar 906. A progress indicator clock 904 may communicate or display a time position within a video program relative to the total program time 905. At the illustrated time, a video program has reached a first predetermined ad slot; by way of example, times of future (or present/past) ad slots are indicated in the progress bar by indicators 910. During an ad slot, a service message 916 may be caused to appear informing the user of remaining time before the ad break is finished, as illustrated in FIG. 9. In the illustrated example, a house ad including a promotional message for "The New Show" is depicted in the video window 902 during an ad slot, while program information for the current video program is provided in the upper display area 901. It should be appreciated that the house ad may be in the form of a visually complex video, and the appearance of the house ad is simplified in FIGS. 9-11 for illustrative clarity. In the alternative, or in addition, the video window 902 or other section of the user interface 900 may be used to display static elements, for example, a static thumbnail image 930 depicting a frame of a suggested next video program, and/or text 932 pertaining to the suggested next video program, In some embodiments, the static element or elements may be presented concurrently with a different house ad or paid advertising appearing in the video window 902.

FIG. 10 illustrates an example of the user interface module 900 at a slightly later time of the ad slot in which the house ad shown in FIG. 9 appears. Optionally, a promotional trailer for the next video program, or other video content, may appear in the video window at this time. In the alternative, or in addition, one or more static elements (e.g., thumbnail image 930 or text 932) may remain or appear in the video window at this time. The video window now includes a query message 918 asking if the user would like to watch "The New Show" when finished with the current video, wherein "The New Show" represents a video program for watching next, automatically selected based on session analysis. Interactive response objects 920, 922 are provided adjacent to the query message. Using a pointing device controlling a cursor 924, touchscreen, or other input device, the user may select one of the interactive objects 920 or 922. Selection of the "yes" object 920 may cause the object or client device to initiate transmission of a signal to the server confirming the next program selection. Conversely, selection of the "no" object 922 may cause the object or client device to initiate transmission of a signal to the server rejecting the next program selection. The absence of any response may be interpreted as a null or default response, which may as a matter of system design be made equivalent to confirmation or rejection of the automatically selected next video.

FIG. 11 illustrates an example of the user interface module 900 just after the user has selected the "yes" object 920, causing a confirmation signal to be transmitted to the server. The server may cause a confirmation message 926 to appear in the video window 902, informing the user that the selected program is ready for viewing immediately after the current program is finished or terminated. In the alternative, or in addition, the server may "bookmark" the program by presenting a link to the next program in a prominent position of the user interface 900, so that the next program can easily be selected by the unidentified user after the current program is finished or terminated.

The foregoing examples may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented using software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

Video Host Server Operations and Apparatus

Figure 12:
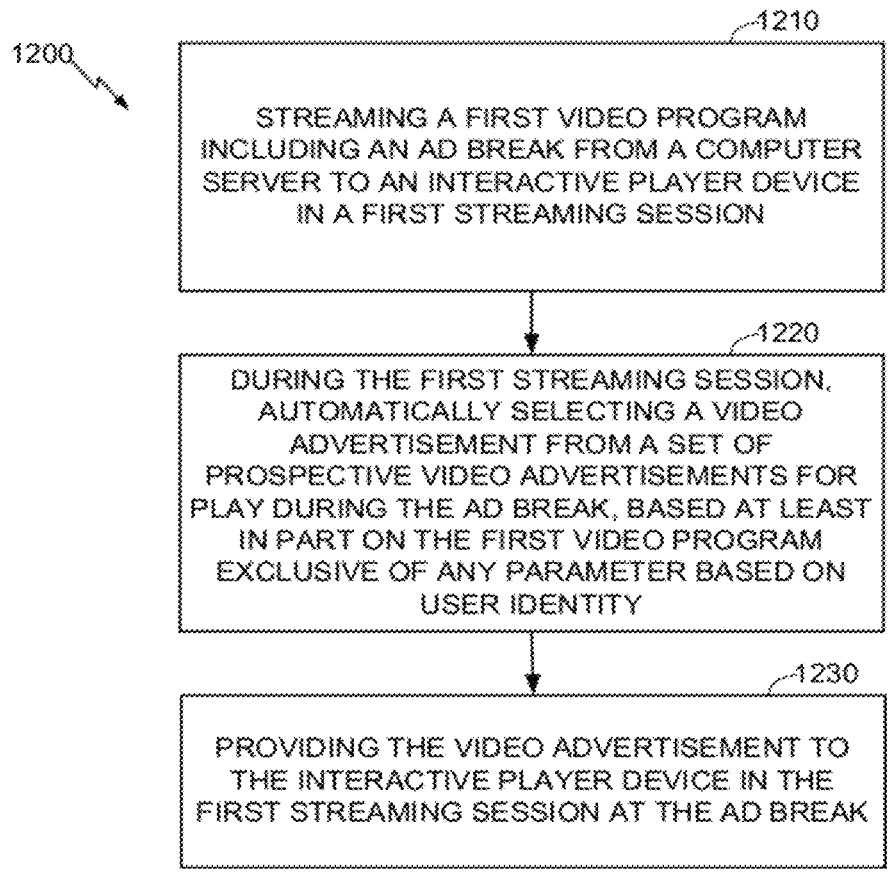

As shown in FIG. 12, a streaming video server may perform a method 1200 for selecting a video advertisement (e.g., house ad) or next video program based on session attributes for an unidentified user. The method 1200 may include at 1210, streaming a first video program including an ad break from the computer server to an interactive player device in a first streaming session. The first (i.e., currently active) streaming session may be initiated without identifying a user or user account for the session. For example, the first streaming session may be configured as a guest (unknown user) account. Accordingly, the session is not associated with any defined user profile information or history of system use for a particular user. Optionally, using a local cookie or equivalent record, the server may access prior user records for the player (client) device, and may make use of such records, for example operating under an assumption that the player device is used only by a single user and is not shared. Such an assumption may be tested and/or confirmed by observing a consistent use history between the current session and one or more past sessions. For example, by analyzing a cookie or similar record, the server may determine that different episodes of the same show were streamed to the player device during the current streaming session and the most recent past session (or some number of past sessions). Therefore, an inference may be drawn that the sessions were controlled by the same user.

The method 1200 may further include, at 1220, automatically selecting a video advertisement from a set of prospective video advertisements for play during the ad break, based at least in part on the first video program exclusive of any parameter based on user identity. For example, the server may develop an inferred user demographic or preference profile based on an analysis of the current session, optionally including records of prior sessions with the same client. The video advertisements may be characterized as house ads (unsponsored promotional segments). The inferred demographic or preference profile may be used to exclude unsuitable advertisements from a candidate set, and/or for ranking or prioritizing candidate advertisements. The use of session analysis data does not necessarily exclude the use of other parameters to automatically select the ad. However, when the streaming session is anonymous, the session may exclude the use of profile, preference, demographic, or other data belonging to a specific user account or identifier. The session analysis may, in some embodiments, be limited to the current streaming session and may therefore be limited to as little as observing a single video program. Further details of session analysis may be as described herein above.

The method 1200 may further include, at 1230, providing the video advertisement to the interactive player device in the first streaming session at the ad break. For example, the video advertisement may be streamed to the player device using one or more computer networks. After receiving the streamed advertisement, the player device may output the advertisement to a display device, using a media player component.

With reference to FIGS. 13-15, several additional operations 1300, 1400 and 1500 are depicted for automatically selecting a next video program or house ad, which may be performed by a computer server, alone or in combination with a client device and/or another server. One or more of operations 1300, 1400 and 1500 may optionally be performed as part of method 1200. The elements 1300, 1400 and 1500 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 1200 includes at least one of the operations 1300, 1400 and 1500, then the method 1200 may terminate after the at least one operation, without necessarily having to include any subsequent downstream operation(s) that may be illustrated.

With reference to FIG. 13, the operations 1300 may be performed in combination with method 1200, or independently as a separate method. In the later case, the independent method may include the initial operation 1210 of method 1200. In the former case, the method 1200 may further include, at 1310, automatically selecting a second video program from a set of prospective video programs, based at least in part on the first video program exclusive of any parameter based on user identity. For example, the selection may be made based solely on attributes of the current session with the interactive player device and attributes of each program in the set of prospective video programs. The second video program is different and distinct from advertising configured to play in an ad slot. The second video program may include its own ad slots and is configured for independent play in a media player. The second video program, like the first video program, may comprise library content of the streaming system designed to attract the viewing interest of users and satisfy audience demand for video content. The selection may be may automatically based on session analysis as described in more detail herein above.

The method 1200 may further include, at 1320, associating the video advertisement with an interactive object for indicating user selection of the second video program. An example of an interactive object ("yes" object 920) is shown in FIG. 10 above; many other interactive objects may also be suitable. In embodiments providing such interactive objects, the method 1200 may further include, at 1330, receiving a signal from the interactive player device indicating the user selection of the second video program. In addition, the method 1200 may include, at 1340, detecting a completion of the first streaming session on the player device, for example by receiving an end beacon signal from the player device. The method 1200 may further include automatically initiating a second streaming session to the interactive player device including the second video program, conditioned on receiving the signal and detecting the completion of the first streaming session. In some embodiments, automatically initiating the second streaming session may be performed immediately after the completion of the first streaming session without waiting for further user input. In other embodiments, the second video program may be bookmarked in a web page of the streaming system associated with the first streaming session, where the user may select the bookmark to initiate a second streaming session for the second video program.

With reference to FIG. 14, the method 1200 may further include, at 1410, automatically selecting the second video program based on a popularity of each program in the set of prospective video programs. For example, the server may identify and select the most popular program for the video streaming system within a recent time period, for example, the past 24 hours, 72 hours, past week, or other period. Accordingly, method 1200 may further include, at 1420, determining the popularity for each program within a recent time period. In an alternative aspect, the method 1200 may further include, at 1430, automatically selecting the second video program based on a rate of increase in popularity of each program in the set of prospective video programs, again over a defined recent time period. In this case, the selected second video program may be a program that is likely to become the most popular, or at least significantly more popular, in the near future.

With reference to FIG. 15, the method 1200 may further include, at 1510, automatically selecting the video advertisement based on a subscription status determined for the streaming session. For example, if the user is unknown the subscription status may be inferred to be "not subscribed," and a house ad promoting a subscription may be selected. Conversely, if the user identity is known and the status is subscribed, subscription promotional ads may be avoided unless and until the subscription is near or past expiration.

In yet another example, the method 1200 may further include, at 1510, prioritizing video ad candidates in a priority order based on ad types. In other words, a pre-established priority order may be followed based on ad type, for example according to the detailed example set forth above. In such cases, the method 1200 may further include, at 1530, automatically selecting the video advertisement from the set of prospective video advertisements based on a priority order of candidates in the set based on ad type.

Figure 16:
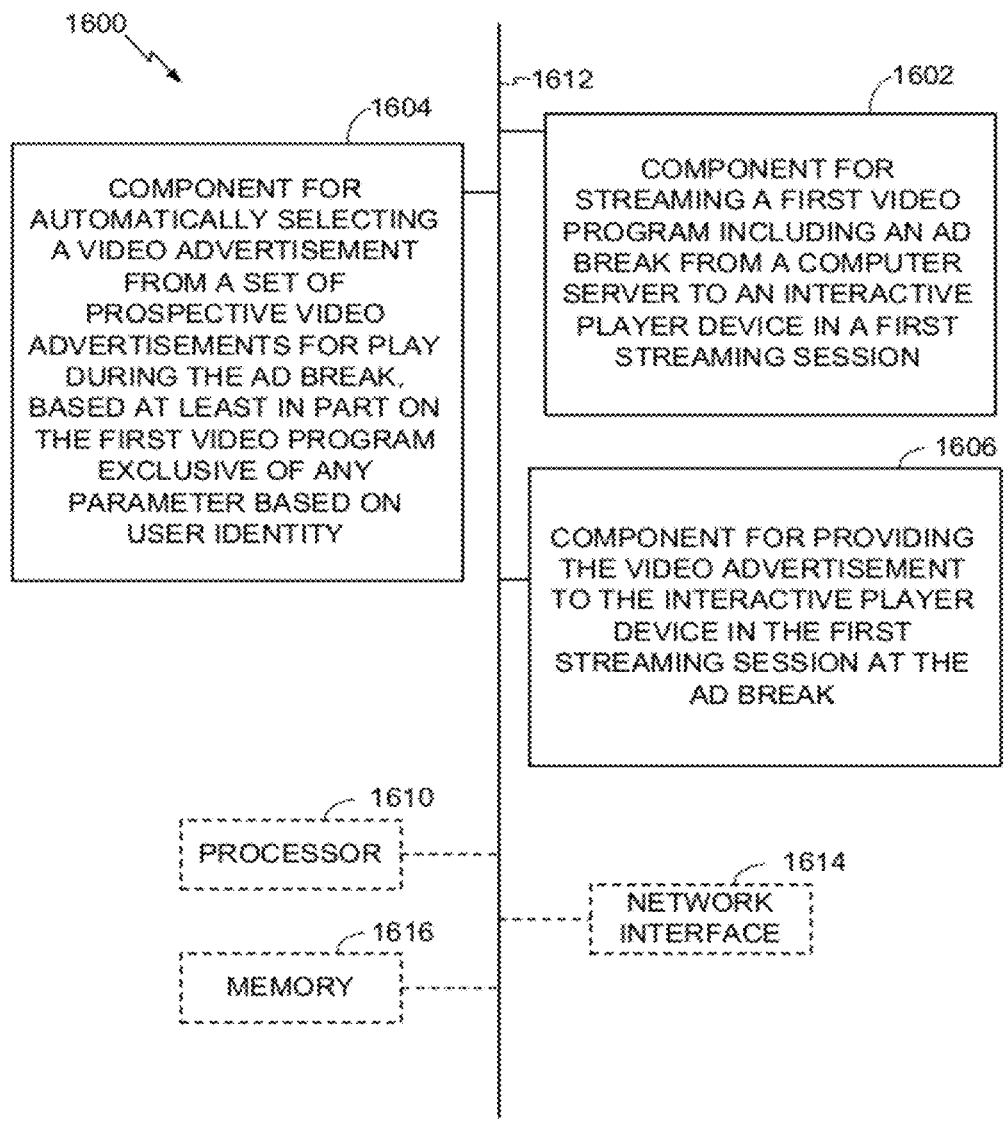
FIG. 16 is a diagram illustrating a server apparatus configured for next ad and/or next content selection based on session analysis without using a user identity-based parameter.

With reference to FIG. 16, there is provided an exemplary apparatus 1600 that may be configured as computer server, client device, or combination of client and server, for providing a link to digital audio/video content responsive to user comment data. The apparatus 1600 may include functional blocks that can represent functions implemented by a processor, software, or combination thereof (e.g., firmware).

As illustrated, in one embodiment, the apparatus 1600 may include an electrical component or means 1602 for streaming a first video program including an ad break from a computer server to an interactive player device in a first streaming session. For example, the electrical component or means 1602 may include at least one control processor 1610 coupled to a memory component 1616. The control processor may operate an algorithm, which may be held as program instructions in the memory component. The algorithm may include, for example, setting up a streaming control interface for a streaming session with a client device operated by an unidentified user, communicating control signals with the client device over the control interface, selecting and packetizing a video program in response to one or more control signals from the client device, and streaming the packetized video data to the client device until reaching each predetermined ad slot defined for the video data. In the alternative, or in addition, the algorithm may include further details as described in connection with FIG. 5 or 6 above, or elsewhere herein.

The apparatus 1600 may further include an electrical component or module 1604 for automatically selecting a video advertisement from a set of prospective video advertisements for play during the ad break, based at least in part on the first video program exclusive of any parameter based on user identity. For example, the electrical component or means 1604 may include at least one control processor 1610 coupled to a memory component 1616. The control processor may operate an algorithm, which may be held as program instructions in the memory component. The algorithm may include, for example, further operations as described in connection with FIG. 7, or as described elsewhere herein.

The apparatus 1600 may further include an electrical component or module 1606 for providing the video advertisement to the interactive player device in the first streaming session at the ad break. For example, the electrical component or means 1606 may include at least one control processor 1610 coupled to a memory component 1616. The control processor may operate an algorithm, which may be held as program instructions in the memory component. The algorithm may include, for example, streaming the selected video advertisement using a control interface of the streaming session as established by the component 1602 during streaming of the video program.

The apparatus 1600 may include similar electrical components for performing any or all of the additional operations 1300, 1400 and 1500 described in connection with FIGS. 13-15, which for illustrative simplicity are not shown in FIG. 16.

In related aspects, the apparatus 1600 may optionally include a processor component 1610 having at least one processor, in the case of the apparatus 1600 configured as a network entity. The processor 1610, in such case, may be in operative communication with the components 1602-1606 or similar components via a bus 1612 or similar communication coupling. The processor 1610 may effect initiation and scheduling of the processes or functions performed by electrical components 1602-1606.

In further related aspects, the apparatus 1600 may include a network interface component 1614 enabling communication between a client and a server. The apparatus 1600 may optionally include a component for storing information, such as, for example, a memory device/component 1616. The computer readable medium or the memory component 1616 may be operatively coupled to the other components of the apparatus 1600 via the bus 1612 or the like. The memory component 1616 may be adapted to store computer readable instructions and data for implementing the processes and behavior of the components 1602-1606, and subcomponents thereof, or the processor 1610, or the methods disclosed herein. The memory component 1616 may retain instructions for executing functions associated with the components 1602-1606. While shown as being external to the memory 1616, it is to be understood that the components 1602-1606 can exist within the memory 1616.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented using electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   sending, by a computing device, a first video program including an ad break to an interactive player device in a first session;
   determining, by the computing device, that no user identity has been identified for the first session;
   determining, by the computing device, a set of video programs qualified for distribution to users where no user identity has been identified;
   when no user identity has been identified, during the first session, automatically selecting, by the computing device, a video advertisement from a set of prospective video advertisements for play during the ad break using an attribute determined for the first session exclusive of any parameter based on user identity, wherein the video advertisement promotes a second video program in the set of video programs; and providing, by the computing device, the video advertisement to the interactive player device in the first session at the ad break.

2. The method of claim 1, further comprising automatically selecting the second video program from the set of video programs using the attribute exclusive of any parameter based on user identity.

3. The method of claim 2, further comprising associating the video advertisement with an interactive object for allowing user selection of the second video program.

4. The method of claim 3, further comprising receiving a signal from the interactive player device indicating the user selection of the second video program.

5. The method of claim 4, further comprising detecting a completion of the first session.

6. The method of claim 5, further comprising automatically initiating a second session to the interactive player device including the second video program, conditioned on receiving the signal and detecting the completion of the first session.

7. The method of claim 6, wherein automatically initiating the second session is performed immediately after the completion of the first session without waiting for further user input.

8. The method of claim 2, wherein automatically selecting the second video program is further based on a popularity of each program in the set of prospective video programs.

9. The method of claim 8, further comprising determining the popularity for each program in the set of prospective video programs within a recent time period.

10. The method of claim 2, wherein automatically selecting the second video program is further based on a rate of increase in popularity of each program in the set of prospective video programs.

11. The method of claim 1, wherein automatically selecting the video advertisement is further based on a subscription status determined for the first session.

12. The method of claim 1, wherein automatically selecting the video advertisement from the set of prospective video advertisements is further based on a priority order of candidates in the set based on ad type.

13. The method of claim 1, wherein:
the set of prospective video advertisements are specified for sending during sessions in which no user identity has been identified.

14. An apparatus, comprising:
at least one processor configured for:
sending a first video program including an ad break to an interactive player device in a first session;
determining a set of video programs qualified for distribution to users where no user identity has been identified;
determining that no user identity has been identified for the first session;
when no user identity has been identified, automatically selecting a video advertisement from a set of prospective video advertisements for play during the ad break, using an attribute determined for the first session exclusive of any parameter based on user identity, wherein the video advertisement promotes a second video program in the set of video programs; and
providing the video advertisement to the interactive player device in the first session at the ad break; and
a memory coupled to the at least one processor for storing data.

15. The apparatus of claim 14, wherein the processor is further configured for automatically selecting the second video program from the set of video programs using the attribute exclusive of any parameter based on user identity.

16. The apparatus of claim 15, wherein the processor is further configured for associating the video advertisement with an interactive object for indicating user selection of the second video program.

17. The apparatus of claim 16, wherein the processor is further configured for receiving a signal from the interactive player device allowing the user selection of the second video program.

18. The apparatus of claim 17, wherein the processor is further configured for detecting a completion of the first session.

19. The apparatus of claim 18, wherein the processor is further configured for automatically initiating a second session to the interactive player device including the second video program, conditioned on receiving the signal and detecting the completion of the first session.

20. The apparatus of claim 19, wherein the processor is further configured for automatically initiating the second session immediately after the completion of the first session, without waiting for further user input.

21. The apparatus of claim 15, wherein the processor is further configured for automatically selecting the second video program based on a popularity of each program in the set of prospective video programs.

22. The apparatus of claim 21, wherein the processor is further configured for determining the popularity for each program in the set of prospective video programs within a recent time period.

23. The apparatus of claim 15, wherein the processor is further configured for automatically selecting the second video program based on a rate of increase in popularity of each program in the set of prospective video programs.

24. The apparatus of claim 14, wherein the processor is further configured for automatically selecting the second video program based on a subscription status determined for the first session.

25. The apparatus of claim 14, wherein the processor is further configured for automatically selecting the video advertisement from the set of prospective video advertisements based on a priority order of candidates in the set based on ad type.

26. A computer program product, comprising:
a non-transitory computer-readable medium encoded with instructions that when executed by a processor cause a computer to perform the operations of:
sending a first video program including an ad break to an interactive player device in a first session;
determining a set of video programs qualified for distribution to users where no user identity has been identified;
determining that no user identity has been identified for the first session;
when no user identity has been identified, automatically selecting a video advertisement from a set of prospective video advertisements for play during the ad break, using an attribute determined for the first session exclusive of any parameter based on user identity, wherein the video advertisement promotes a second video program in the set of video programs; and
providing the video advertisement to the interactive player device in the first session at the ad break.

* * * * *